United States Patent
Schepperle

(10) Patent No.: US 6,718,841 B1
(45) Date of Patent: Apr. 13, 2004

(54) GEARBOX

(75) Inventor: Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/130,460

(22) PCT Filed: Nov. 28, 2000

(86) PCT No.: PCT/EP00/11864

§ 371 (c)(1),
(2), (4) Date: May 16, 2002

(87) PCT Pub. No.: WO01/40678

PCT Pub. Date: Jun. 7, 2001

(30) Foreign Application Priority Data

Dec. 2, 1999 (DE) .......................... 199 57 985

(51) Int. Cl.$^7$ .............................. F16H 3/091
(52) U.S. Cl. ........................................ 74/359
(58) Field of Search .................. 74/325, 329, 359, 74/375

(56) References Cited

U.S. PATENT DOCUMENTS

| | | | | |
|---|---|---|---|---|
| 4,271,715 A | * | 6/1981 | Arai ............................. | 74/360 |
| 5,014,567 A | | 5/1991 | Horiuchi et al. ............... | 74/359 |
| 5,351,569 A | | 10/1994 | Trick et al. .................... | 74/329 |
| 5,881,600 A | | 3/1999 | Fan .............................. | 74/329 |
| 6,318,211 B1 | | 11/2001 | Nitzschke et al. ............. | 74/745 |

FOREIGN PATENT DOCUMENTS

| | | | | |
|---|---|---|---|---|
| DE | 21 37 440 C2 | 9/1983 | ............. | F16H/3/08 |
| DE | 38 40 403 A1 | 7/1989 | ............. | B60K/17/08 |
| DE | 41 29 290 C1 | 2/1993 | ............. | B60K/17/08 |
| DE | 42 26 576 A1 | 2/1994 | ............. | B60K/17/08 |
| DE | 196 14 930 C1 | 8/1997 | ............. | B60K/17/08 |
| EP | 0 916 871 A1 | 5/1999 | ............. | F16H/37/04 |
| EP | 1 122 463 A2 | 1/2001 | ............. | F16H/3/091 |
| FR | 1.258.053 | 2/1961 | | |
| FR | 2.178.502 | 11/1973 | ............. | F16H/5/00 |
| FR | 2 623 869 | 6/1989 | ............. | F16H/57/02 |
| GB | 1 356 258 | 6/1974 | ............. | F16H/3/08 |
| WO | 99/28654 | 6/1999 | ............. | F16H/37/04 |

* cited by examiner

*Primary Examiner*—Ankur Parekh
(74) *Attorney, Agent, or Firm*—Davis & Bujold, PLLC

(57) ABSTRACT

A transmission with a drive shaft (10), an output shaft (20) mounted coaxially thereto and a countershaft (30), there being provided a first constant gear pair (K1) that can transmit the rotation of the countershaft (30) to the output shaft (20) and wherein respective toothed gear pairs are allocated to the individual gears, the gear pairs optionally transmitting the rotation of the drive shaft (10) to the countershaft (30). A second constant gear pair (K2) can transmit the rotation of the countershaft (30) to the output shaft (20). The toothed gears (1-1, 1-2; 2-1, 2-2; 3-1, 3-2) of a gear of a first group of gears can be optionally select to be operative between the drive shaft (10) and the countershaft (30), the rotation of the countershaft (30) being transmissible via the first constant air (K1) to the output shaft (20). After switching to the second constant gear pair (K2), a gear of a second group of gears, via the second constant gear pair (K2) can be switched to the output shaft (20) by selecting a toothed gear pair (3-1, 3-2) of a gear of the first group and transmitting the rotation of the countershaft (30) via the second constant gear pair (K2).

7 Claims, 4 Drawing Sheets

| Gear | Transmission Ratio | Gear Ratio |
|---|---|---|
| 1 | $i_1 * i_{K1}$ | $\Phi_1 = i_1 / i_2$ |
| 2 | $i_2 * i_{K1}$ | $\Phi_2 = i_2 / i_3$ |
| 3 | $i_3 * i_{K1}$ | $\Phi_3 = i_3 * i_{K2}{}^{1)}$ |
| 4 | $i_4 * i_{K1} = i_{K1}/i_{K2}$ | $\Phi_3 = i_3 * i_{K2}$ |
| 5 | $i_3 * i_{K2}$ | $\Phi_3 = i_3 * i_{K2}$ |
| 6 | direct | |

1) Condition $i_{K1}/i_{K2} = (\Phi_3)^2$

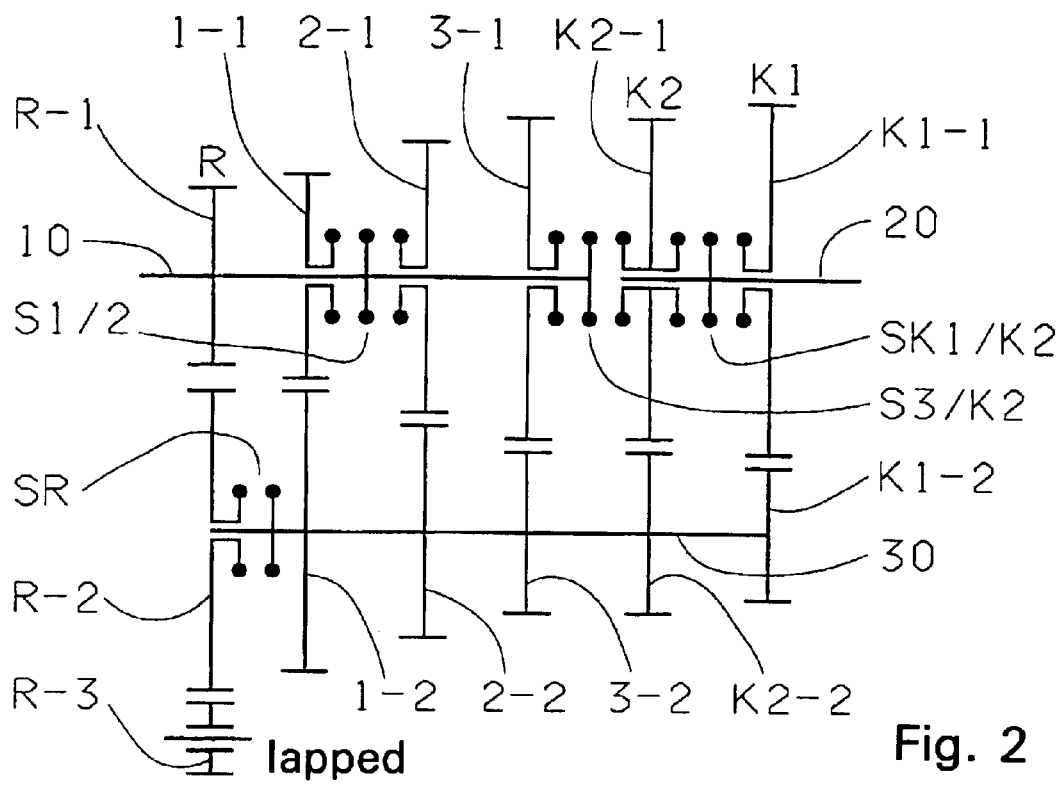
Fig. 2
| Gear | Transmission Ratio | Gear Ratio |
|---|---|---|
| 1 | $i_1 * i_{K1}$ | $\varphi_1 = i_1 / i_2$ |
| 2 | $i_2 * i_{K1}$ | $\varphi_2 = i_2 / i_3$ |
| 3 | $i_3 * i_{K1}$ | $\varphi_3 = i_3 * i_{K2}$ [1] |
| 4 | $i_4 * i_{K1} = i_{K1} / i_{K2}$ | $\varphi_3 = i_3 * i_{K2}$ |
| 5 | $i_3 * i_{K2}$ | $\varphi_3 = i_3 * i_{K2}$ |
| 6 | direct | $\varphi_3 = i_3 * i_{K2}$ |
[1] Condition $i_{K1} / i_{K2} = (\varphi_3)^2$
Fig. 3
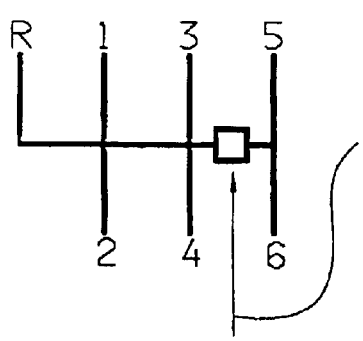
Disengagement of the Externally actuated Group switch
Fig. 4

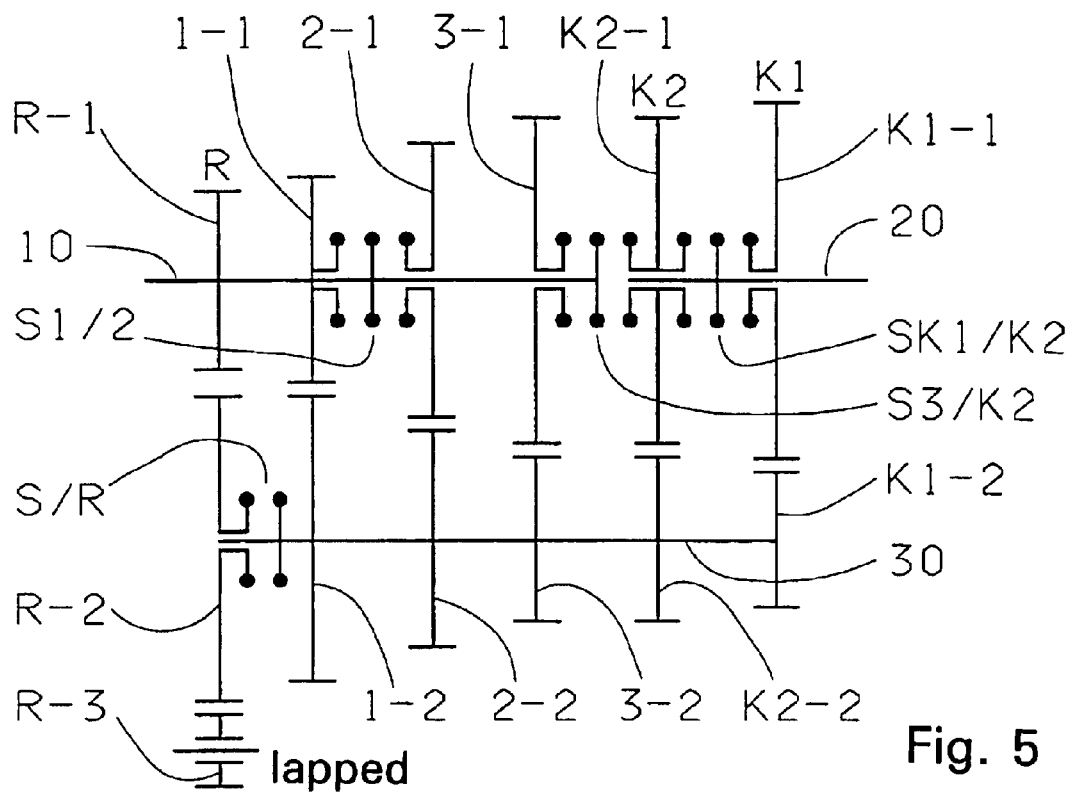
Fig. 5
| Gear | Transmission Ratio | Gear Ratio |
|---|---|---|
| 1 | $i_1 * i_{K1}$ | $\varphi_1 = i_1 / i_2$ |
| 2 | $i_2 * i_{K1}$ | $\varphi_1 = i_1 / i_2$ 1) |
| 3 | $i_1 * i_{K2}$ | $\varphi_1 = i_1 / i_2$ |
| 4 | $i_2 * i_{K2}$ | $\varphi_2 = i_2 / i_3$ |
| 5 | $i_3 * i_{K2}$ | $\varphi_3 = i_3 * i_{K2}$ |
| 6 | direct | |
1) Condition $i_{K1} / i_{K2} = (\varphi_1)^2$
Fig. 6
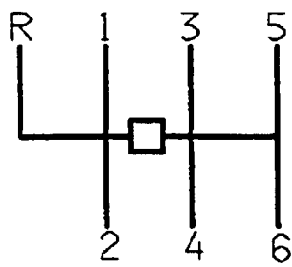
Fig. 7

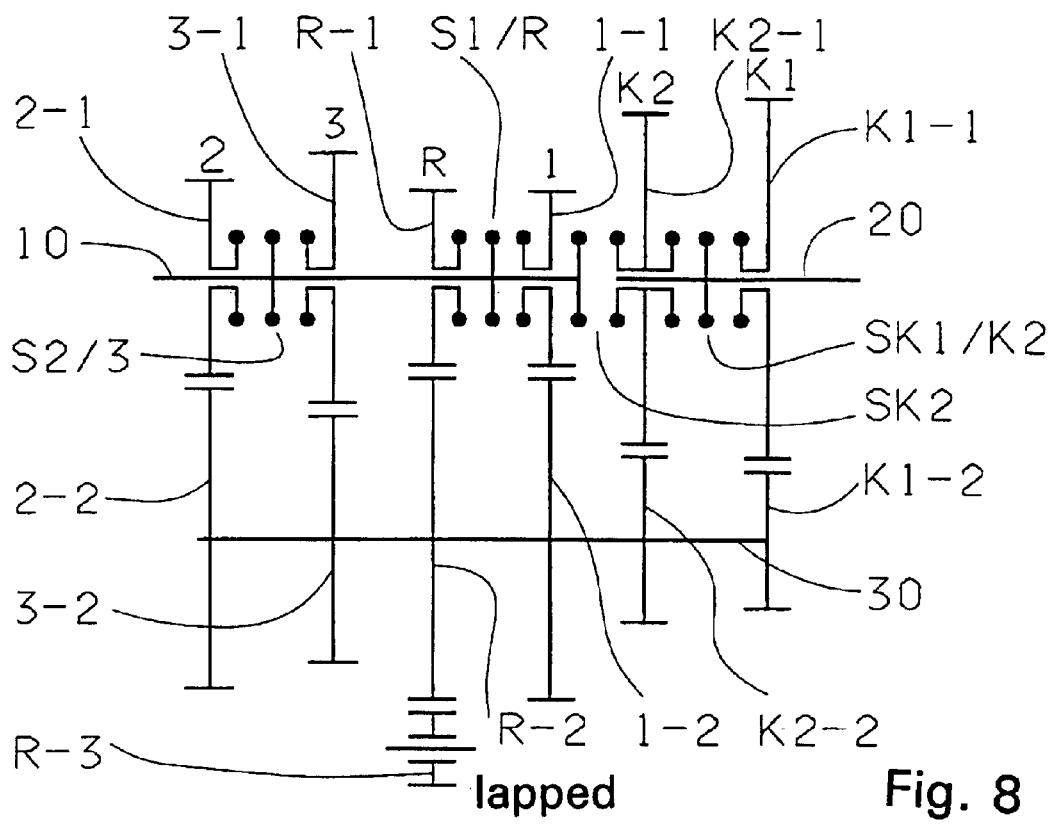
Fig. 8
| Gear | Transmission Ratio | Gear Ratio |
|---|---|---|
| 1 | $i_1 * i_{K1}$ | $\varphi_1 = i_1 / i_2$ |
| 2 | $i_2 * i_{K1}$ | $\varphi_2 = i_2 / i_3$ |
| 3 | $i_3 * i_{K1}$ | $\varphi_2 = i_2 / i_3$ [1] |
| 4 | $i_2 * i_{K2}$ | $\varphi_2 = i_2 / i_3$ |
| 5 | $i_3 * i_{K2}$ | $\varphi_3 = i_3 * i_{K2}$ |
| 6 | direct | |
[1] Condition $i_{K1} / i_{K2} = (\varphi_2)^2$
Fig. 9
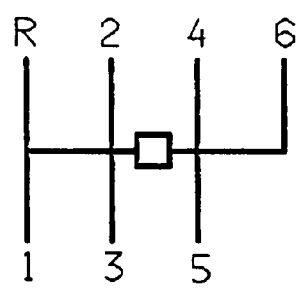
Fig. 10

GEARBOX

FIELD OF THE INVENTION

This invention relates to a transmission.

BACKGROUND OF THE INVENTION

For industrial vehicles of the medium class up to about 30 t total weight and about 1000 Nm motor torque, manually shifted six-gear transmissions are preferably used. According to FIG. 1 such a six-gear transmission in countershaft design and progressive gear grading comprises one drive shaft 10, one output shaft 20 and one countershaft 30. An input constant gear pair K-1, K-2 is provided on the input side, which transmits the rotation of the drive shaft 10 to the countershaft 30. Upon the output shaft 20 are located the toothed gears 5-1, 4-1, 3-1, 2-1, 1-1 and R-1 as idler gears which are allocated respectively to the fifth gear, the fourth gear, the third gear, the second gear, the first gear and the reverse gear. The corresponding toothed gears 5-2, 4-2, 3-2, 2-2 and 1-2 are non-rotatably situated upon the countershaft 30. The toothed gear 1-2 is allocated both to the first gear and to the reverse gear R during an intermediate switch of an intermediate toothed gear R-3. The synchronizing clutch links S1/2, S3/4, S5/6 and SR are located upon the output shaft, the synchronizing clutch line S5/6 being moved to the right to engage the fifth gear in FIG. 1, the synchronizing clutch link S3/4 to the left to engage the fourth gear and to the right to engage the third gear, the synchronizing clutch link S1/2 to the left to engage the second gear and to the right to engage the first gear, the synchronizing clutch link SR to the right to engage the reverse gear and to engage the sixth gear the synchronizing clutch link S5/6 to the left to directly connect the drive shaft 10 with the output shaft 20.

About 95% of all transmission have the configuration of FIG. 1. Problems with these transmissions consist in the relatively great bearing span width and the shaft bendings associated therewith which, in turn, result in limiting the capacity for torque transmission. Transmissions of this kind required a large axial space and are thus relatively heavy and expensive. On account of the large masses to be synchronized, very strong shifting forces have to be applied.

Also six-gear transmissions are known where the constant gear pair is placed upon the output side. Problems with those transmissions consist in that, when the output shaft is not coaxially situated relative to the drive shaft, a comparatively high construction cost is required, but when the drive shaft and the output shaft are disposed coaxially to each other, a relatively large axial distance from the countershaft results.

The problem on which this invention is based consists in providing a transmission configured so that the manual shifting forces required are substantially reduced, the shafts are made short and the construction cost is small.

SUMMARY OF THE INVENTION

The essential advantage of the inventive transmission consists in that by virtue of the arrangement on the output side of two constant gear pairs (output constant group), the transmission is divided in two parts, namely, one part on the input side and one part on the output side whereby the constant gear pairs of the transmission part on the output side can be separately switched. Thereby two ratios are available in the transmission part on the output side. The switching between the constant gear pairs of the transmission part on the output side is automatic and externally controlled at a precisely defined point when preselecting the gear to be engaged. A sharp reduction of the manual shifting forces is advantageously obtained by the inventive idea, since almost all rotary masses are connected with the output and do not have to be synchronized together. The inventive transmission advantageously has a small number of gear stresses compared with the already known transmissions. All synchronizations that are switched in the driving operation under high differential rotational speed, especially that of the second gear, are located upon the input shaft. This arrangement is most favorable for the level of shifting force. One gear in the inventive transmission, preferably the highest gear, can be advantageously designed as direct gear. This increases the degree of efficiency. The inventive transmission is advantageously adequate for a high torque transmission, since its shafts are made short and therefore resist even high loads with only slight deformation. The instant transmission can advantageously be expended to a seven-gear transmission. By implementing a neutral position of the output group, the countershaft can act as a power take off on the output side by coupling any desired gear synchronization without added expense.

BRIEF DESCRIPTION OF THE DRAWINGS

The invention will now be described, by way of example, with reference to the accompanying drawings in which:

The invention and development thereof are explained in detail herebelow in relation to the figures which show:

FIG. 2 is a first embodiment of the inventive transmission;

FIG. 3 is a tabulation of the ratios and ratio steps of the individual gears of the transmission according to the first embodiment;

FIG. 4 is a gear shift pattern of the transmission according to the first embodiment;

FIG. 5 is a second embodiment of the inventive transmission;

FIG. 6 is a tabulation of the ratios and ratio steps of the individual gears of the transmission according to the second embodiment;

FIG. 7 is a gear shift pattern of the transmission according to the second embodiment;

FIG. 8 is a third embodiment of the inventive transmission;

FIG. 9 is a tabulation of the ratios and ratio steps allocated to the respective gears of the third embodiment;

FIG. 10 is a gear shift pattern of the transmission according to the third embodiment.

DETAILED DESCRIPTION OF THE INVENTION

Figure 1:
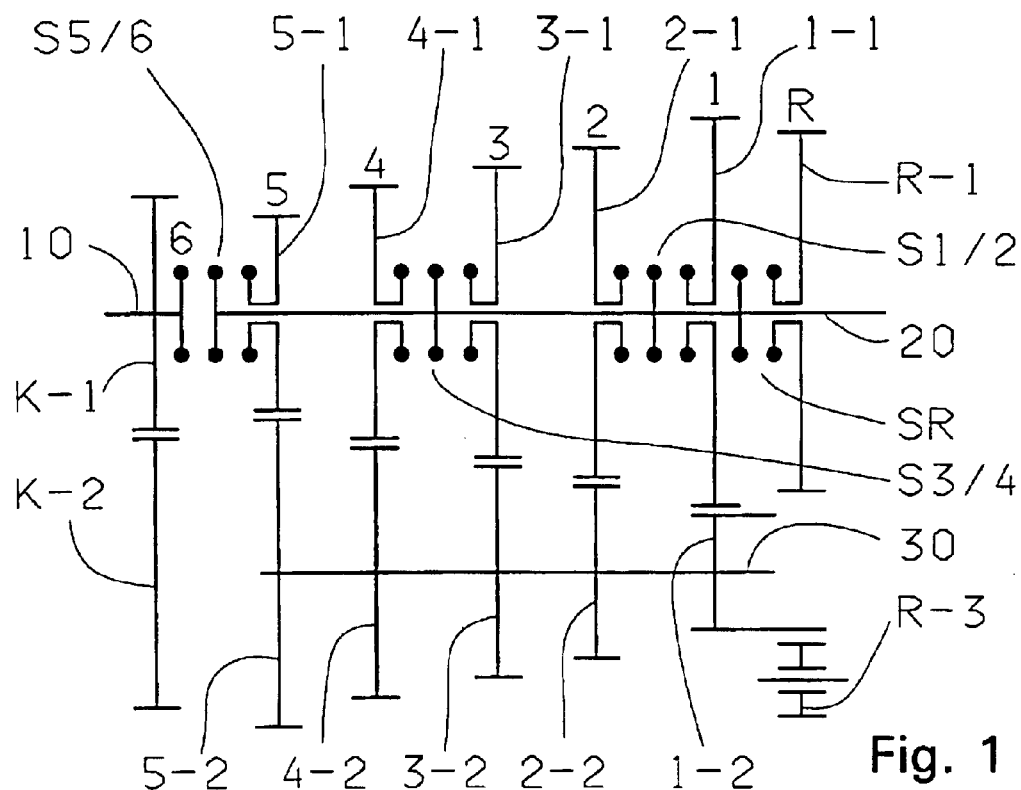
FIG. 1 is a diagrammatic representation of a known six-gear transmission with a constant gear pair on the input side.

In relation to FIG. 2, the first embodiment of the instant transmission is explained below. In relation to FIG. 1, details are already explained in a corresponding manner. Upon the drive shaft 10, the toothed wheel 1-1 allocated to the first gear are located as idler gears, the toothed wheel 2-1 allocated to the second gear and the toothed wheel 3-1 allocated to the third and fifth gears. Upon the countershaft 30, the corresponding toothed gears 1-2, 2-2 and 3-2 are non-rotatably situated. The toothed gears are preferably spur toothed gears. Gears 1 and 2 are actuated by moving the synchronizer clutch line S1/2 to the right or to the left. The third gear is actuated by moving the synchronizing clutch link S3/K2 to the left. When engaging the first, second and third gears, the synchronizing clutch link SK1/K2 is moved to the right so that the transmission from the countershaft 30 to the output shaft 20 takes place, via the constant gear pair K1, which has the toothed gear K1-1 as idler gear upon the output shaft 20 and, upon the countershaft 30, has non-rotatably the toothed gear K1-2.

Upon the output shaft 20, the toothed gear K2-1 of a second constant gear pair K2 is situated as idler gear whose other toothed gear K2-2 is non-rotatably secured to the countershaft 30. The toothed gears of the constant gear pairs K1 and K2 are also preferably spur toothed gears.

The toothed gear K2-1 of the constant gear pair K2 is connected with the drive shaft 10 by moving the synchronizing clutch link S3/K2 to the right being thus allocated to the fourth gear. By moving the synchronizer clutch link SK1/K2 to the left, the second toothed gear K2-1 of the second constant gear pair K2 is joined to the output shaft 20. The sixth gear is engaged by simultaneously switching the synchronizing clutch link S3/K2 to the right and the synchronizing clutch link SK1/K2 to the left. The transmission from the drive shaft 10 to the output shaft 20 then takes place directly via the toothed gear K2-1 of the second constant gear pair K2.

The toothed gear R-1 of the reverse gear R is non-rotatably situated upon the drive shaft 10. The corresponding toothed gear R-2, which is driven by the toothed gear R-1, via the intermediate toothed gear R-3, is located as idler gear upon the countershaft 30, and can be actuated by activating the synchronizing clutch link SR situated upon the countershaft 30.

In particular, the first gear 1 is engaged by moving the synchronizing clutch link S1/2 to the left. The toothed gear 1-1 is then joined to the drive shaft 10. It transmits its rotation via the toothed gear 1-2 to the countershaft 30 and from here to the output shaft via the first constant gear pair K1, which is connected with the output shaft 20, by moving the synchronizing clutch link SK1/K2 to the right. The second and the third gear are accordingly actuated by moving the synchronizing clutch link S1/2 to the right and the synchronizing clutch link S3/K2 to the left.

To engage the fourth gear, the synchronizing clutch link S3/K2 is moved to the right, the toothed gear K2-1 of the constant gear pair K2 is connected with the drive shaft 10. The toothed gear transmits its rotation via the toothed gear K2-2 to the countershaft 30 and from here to the output shaft 20 via the constant gear pair K1 whose toothed gear K1-1 (synchronizing clutch link SK1/K2 moved to the right) is connected with the output shaft 20. The toothed gears K2-1 and K2-2 of the constant gear pair K2 thus form the ratio of the fourth gear.

To engage the subsequent gears, the synchronizing clutch link SK1/K2 is externally controlled and automatically moved to the left during the selection movement. To engage the fifth gear, the synchronizing clutch link S3/K2 is also moved to the left so that now the transmission takes place from the countershaft 30 to the output shaft 20 via the constant gear pair K2. It can be understood from the shift pattern of FIG. 4 that, by the selection from the gate of the third and fourth gears to the gate of the fifth and sixth gears, the switch of SK1/K2 is externally Therefore, when engaging the fifth gear, the rotation is transmitted by the drive shaft 10, via the toothed gears 3-1 and 3-2 of the third gear, to the countershaft 30 and from here to the output shaft 20, via the toothed gears K2-2 and K2-1 of the constant gear pair K2. Therefore, after switching of the constant gear pairs K1 and K2, the toothed gears K2-1 and K2-2 of the constant gear pair K2 together with the toothed gears 3-1 and 3-2 of the third gear, are used to constitute the fifth gear. The sixth gear is direct and results by switching S3/K2 to the right with SK1/K2 remaining in the same position.

FIG. 3 shows the ratios and ratio steps existing in the individual gears.

It can be understood that the individual ratios of the instant transmission have to satisfy a specific logic, since individual toothed gear pairs are often used. The toothed gears K2-1 and K2-2 of the constant gear pair K2 are thus used once to constitute the fourth gear in combination with the toothed gears K1-1 and K1-2 of the constant gear pair K1 and once as constant gear pair K2. The toothed gears 3-1 and 3-2 of the third gear are used in combination with the toothed gears K1-1 and K1-2 of the constant gear pair K1 to constitute the third gear and in combination with the toothed gears K2-1 and K2-2 of the constant gear pair K2 to constitute the fifth gear. It is possible with such design to constitute a partly progressive gear grading.

To make the desired, partly progressive ratio steps possible, it is a condition that the ratios of the constant gear pairs K1 and K2 are in a reduction ratio to each other which is the same as that of individual gear wheels. To the transmission of FIG. 2 applies:

$$i_{K1}/i_{K2} = (\phi_3)^2.$$

In the first embodiment, the ratio steps $\phi 1$ and $\phi 2$ from the first to the second gear and from the second to the third gear can be freely selected and can thus be progressively practicable. Then follows a geometric part in which the gradation no longer changes, since the above condition has to be satisfied which results from the division of the ratio of the fourth gear by the ratio of the fifth gear and of the ratio of the third gear by the ratio of the fourth gear. Therefore, a progressive gear grading is to be registered in gears one to three and a geometric gear four to six grading exists for the higher gears.

The geometric portion of the gear grading, which in the first embodiment is in the range of the higher gears (fourth, fifth and sixth gears), can be moved to the start of the gear shift according to the second embodiment shown in FIG. 5. This means that between the gears 1, 2 and 3, the same gear grading exists (see FIG. 6) and that, according to FIG. 7, the externally controlled switching of the constant gear pairs K1 and K2 results during selection of the gate between the first and second gears to the gate between the third and fourth gears. Between the gears four and five or five and six a progressive design of the gear ratios is again possible.

The first gear is engaged by moving the synchronizing clutch link S1/2 to the left. The transmission takes place, via the toothed gears 1-1, 1-2, the countershaft 30 and from here, via the constant gear pair K1, to the output shaft (SK1/K2 moved to the right). Accordingly, the second gear is engaged by moving the synchronizing clutch link S1/2 to the right. When switching to the third gear, that is from the gate of the first and second gears to the gate of the third and fourth gears, the constant gear pairs K1 and K2 are externally switched to the left controlled by actuating the synchronizing clutch link SK1/K2. The third gear is engaged by moving the synchronizing clutch link S1/2 to the left. The transmission, from the input shaft 10 to the output shaft 20, takes place via the toothed gears 1-1, 1-2, the countershaft 30 and the toothed gears K2-2, K2-1. To engage the fourth gear, the synchronizing clutch link S1/2 is accordingly moved to the right and the transmission takes place via the toothed gears 2-1, 2-2, the countershaft 30 and the toothed gears K2-2, K2-1. To engage the fifth gear, the synchronizing clutch link S3/K2 is moved to the left and the transmission takes place via the toothed gears 3-1, 3-2, the countershaft 30 and the toothed gears K2-2, K2-1. The sixth gear is again engaged by moving the synchronizing clutch link SK1/K2 to the right (synchronizing clutch link SK1/K2 is moved to the left), the transmission from the input shaft 10 to the output shaft 20 taking place directly via the toothed gear K2-1 of the constant gear pair K2. To the second embodiment applies the condition: $i_{K1}/i_{K2}=(\phi_1)^2$ to make a partly progressive gear grading possible.

According to the embodiment of FIG. 8, a progressive gear grading exists between the first and second gears and between the fifth and sixth gears whereas the geometric portion is in the middle (second, third and fourth gears). This can be understood from FIG. 9. According to FIG. 10, the externally controlled switching of the constant gear pairs K1 and K2 takes place when selecting from the gate of the second and third gears to the gate of the fourth and fifth gears. There applies the condition: $i_{K1}/i_{K2}=(\phi_2)^2$.

The first, second and third gears, respectively, are engaged by moving the synchronizing clutch link S1/R to the right or the synchronizing clutch link S2/3 to the left or to the right, the transmission taking place via the constant gear pair K1 (synchronizing clutch link SK1/K2 moved to the right). When switching from third to fourth gear, the synchronizing clutch link SK1/K2 is moved to the left and the synchronizing clutch link S2/3 to the left, the transmission from the drive shaft 10 to the countershaft 30 taking place via the toothed gears 2-1 and 2-2, and from the countershaft 30 to the output shaft 20 via the toothed gears K2-2, K2-1. To engage the fifth gear, the synchronizing clutch link S2/3 is moved to the right, the transmission to the output shaft 20 taking place via the toothed gears 3-1 and 3-2, the countershaft 30 and again via the toothed gears K2-2 and K2-1. The sixth gear is engaged by moving the synchronizing clutch link SK2 to the right, the transmission from the input shaft 10 to the output shaft 20 taking place directly via the toothed gear K2-1 of the constant gear pair K2.

Figure 11:
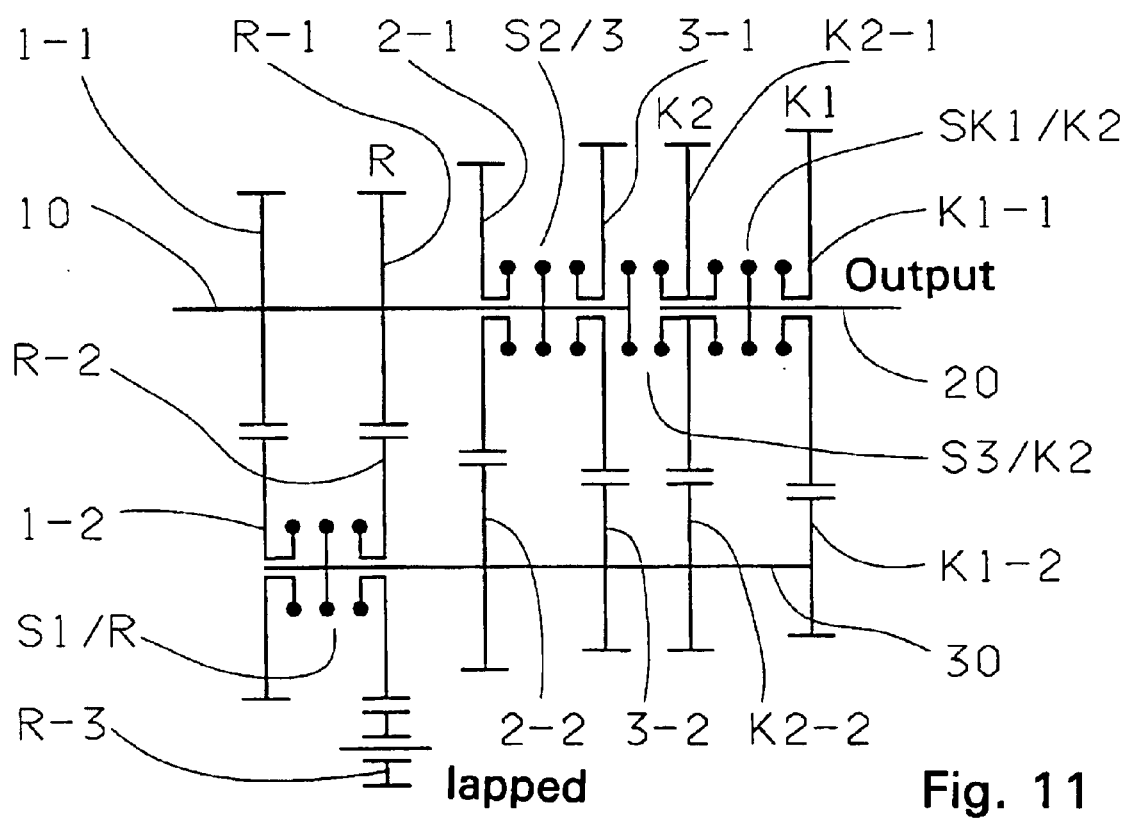
FIG. 11 is a fourth embodiment of the inventive transmission.

The embodiment of FIG. 11 essentially corresponds to that of FIG. 8 only the synchronizing clutch link S1/R for switching between the reverse gear and the first gear is situated upon the countershaft 30.

What is claimed is:

1. A transmission comprising:
    a drive shaft (10);
    an output shaft (20) disposed coaxially relative to the drive shaft (10); and
    a countershaft (30);
    toothed gear pairs being allocated to individual gear speeds of the transmission for transmitting drive from the drive shaft (10) to the countershaft (30); a first constant gear pair (K1) being provided for transmitting drive from the countershaft (30) to the output shaft (20) and a second constant gear pair (K2) being provided for transmitting drive from the countershaft (30) to the output shaft (20), and input toothed gears (1-1, 1-2; 2-1, 2-2; 3-1, 3-2) of a first group of gears are optionally engageable for supplying drive from the drive shaft (10) to the countershaft (30); the first constant gear pair (K1) transferring drive from the countershaft (30) to the output shaft (20) and, upon engagement of the second constant gear pair (K2), one gear of a second group of gears drive being supplied to the output shaft (20) via one of the input toothed gears (1-1, 1-2; 2-1, 2-2; 3-1, 3-2), the countershaft (30) and the second constant gear pair (K2);
    wherein ratios of the constant gear pairs (K1 and K2) correspond to a square of a ratio of two ratios in a geometric part of the gear grading.

2. The transmission according to claim 1, wherein a first gear, a second gear, a third gear and a fourth gear belong to the first group of gears, a drive input for the fourth gear is formed by the toothed gears (K2-1, K2-2) of the second constant gear pair (K2) and, after switching from the first constant gear pair (K1) to the second constant gear pair (K2), a fifth gear is formed by the toothed gears of the third gear and the second constant gear pair (K2), there applying the gear ratio condition of $$i_{K1}/i_{K2}=(\phi_3)^2$$

where
    $i_{K1}$ is a ratio of the first constant gear pair
    $i_{K2}$ is a ratio of the second constant gear pair; and
    $(\phi_3)^2$ the square of a gear step between the gear pairs.

3. The transmission according to claim 2, wherein an idler toothed gear (1-1) for the first gear, an idler toothed gear (2-1) for the second gear and an idler toothed gear (3-1) for the third gear are all dispose upon the drive shaft (10), a first synchronizing clutch (S1/2) is provided for optionally connecting the idler toothed gear (1-1) of the first gear or the idler toothed gear (2-2) of the second gear with the drive shaft (10); an idler toothed gear (K2-1) of the second constant gear pair (K2) and an idler toothed gear (K1-1) of the first constant gear pair (K1) are both disposed upon the output shaft (20), a second synchronizing clutch (S3/K2) is engageable for optionally connecting the drive shaft (10) with the idler toothed gear (3-1) of the third gear or connecting the first toothed gear (K2-1) of the second constant gear pair (K2) with the drive shaft (10) so that the first toothed gear (K2-1) of the second constant gear pair (K2) can form a drive input for the fourth gear, a mating second fixedly connected tooth gear, for each of the first gear, the second gear and the third gear, is supported by the countershaft (30), a third synchronizing clutch (SK1/K2) is switchable for connecting the idler toothed gear (K2-1) of the second constant gear pair (K2) or the idler toothed gear (K1-1) of the first constant gear pair (K1) with the output shaft (20) and, upon switching from the fourth gear to the fifth gear, the idler toothed gear (K1-1) of the first constant gear pair (K1) is disengaged from the output shaft (20) and the idler toothed gear (K2-1) of the second constant gear pair (K2) is engaged with the output shaft (20) while the idler toothed gear (3-1) of the third gear is engaged with the drive shaft (10), and during the sixth gear, the drive shaft (10) is directly connected with the output shaft (20), via the idler toothed gear (K2-1) of the second constant gear pair by actuating the second synchronizing clutch (S3/K2).

4. The transmission according to claim 1, wherein a first gear and a second gear belong to the first group of gears and after shifting from the first constant gear pair (K1) to the second constant gear pair (K2); a third gear is formed by toothed gears of the first gear and toothed gears of the second constant gear pair (K2); a fourth gear is formed by the toothed gears of the second gear and the toothed gears of the second constant gear pair (K2); a fifth gear is formed by toothed gears of the third gear, which are situated between the drive shaft (10) and the countershaft (30), and the toothed gears of the second constant gear pair (K2) and the gear ratio condition:

$$(\phi_1)^2 = i_{K1}/i_{K2} \text{ applies}$$

where $i_{K1}$ is a ratio of the first constant gear pair $i_{K2}$ is a ratio of the second constant gear pair; and $(\phi_1)^2$ the square of a gear step between the gear pairs.

5. The transmission according to claim 1, wherein a first gear, a second gear and a third gear belong to the first group of gears and, after shifting from the first constant gear pair (K1) to the second constant gear pair (K2), a fourth gear is formed by toothed gears of the second gear and the second constant gear pair (K2); a fifth gear is formed by toothed gears of the third gear and the second constant gear pair (K2), and the gear step condition:

$$(\phi_2)^2 = i_{K1}/i_{K2} \text{ applies,}$$

where $i_{K1}$ is a ratio of the first constant gear pair $i_{K2}$ is a ratio of the second constant gear pair; and $(\phi_2)^2$ the square of a gear step between the gear pairs.

6. The transmission according to claim 5, wherein an idler toothed gear (1-1) for the first gear, an idler toothed gear (2-1) for the second gear, an idler toothed gear (3-1) for the third gear and an idler toothed gear (R-1) for a reverse gear (R) are situated upon the drive shaft (10), an idler toothed gear (K1-1) of the first constant gear pair (K1) is situated upon the output shaft (20) and an idler toothed gear (K2-1) of the second constant gear pair (K2) is situated upon the output shaft (20), a mating fixedly connected tooth gear, for each of the first gear, the second gear, the third gear and the reverse gear, is supported by the countershaft (30), when selecting the first gear or the reverse gear (R), by actuating a fifth synchronizing clutch (S1/R) and connecting the idler toothed gear (1-1) of the first gear or the idler toothed gear (R-1) of the reverse gear (R) with the drive shaft (10) or when selecting the second gear or third gear by actuating a sixth synchronizing clutch (S2/3) and connecting the idler toothed gear (2-1) of the second gear or the idler toothed gear (3-1) of the third toothed gear with the drive shaft (10), drive is transmitted from the countershaft (30) to the output shaft (20) via the first constant gear pair (K1); the first toothed gear (K1-1) of which is connected with the output shaft (20) by actuating a third synchronizing link (SK1/K2), when shifting from the third gear to the fourth gear, the third synchronizing clutch (SK1/K2) engages the idler toothed gear (K2-1) of the second constant gear pair (K2) with the output shaft (20) and disengages the idler toothed gear (K1-1) of the first constant gear pair (K1) from the output shaft (20), and the sixth synchronizing clutch (S2/3) connects the idler toothed gear (2-1) of the second gear with the drive shaft (10), when engaging a fifth gear, the sixth synchronizing clutch (S2/3) engages the idler toothed gear (3-1) of the third gear with the drive shaft (10) and, when engaging a sixth gear, a seventh synchronizing clutch (SK2) and the third synchronizing clutch (SK1/K2) engage the idler toothed gear (K2-1) of the second constant gear pair (K2) with the drive shaft (10) so that drive of the idler toothed gear (K2-1) of the second constant gear pair (K2) is directly transmitted to the output shaft (20).

7. The transmission according to claim 5, wherein a fixed toothed gear (1-1) of the first gear, an idler toothed gear (2-1) of the second gear, an idler toothed gear (3-1) of the third gear and a fixed toothed gear (R-1) of the reverse gear (R) are situated upon the drive shaft (10); an idler toothed gear (1-2) of the first gear and an idler toothed gear (R-2) of the reverse gear (R) are situated upon the countershaft (30), a fifth synchronizing clutch (S1/R) is operable for engaging the idler toothed gear (R-2) of the reverse gear (R) with the countershaft (30) or engaging the idler toothed gear (1-2) of the first gear with the countershaft (30); an idler toothed gear (K1-1) of the first constant gear pair (K1) is situated upon the output shaft (20) and an idler toothed gear (K2-1) of the second constant gear pair (K2) is situated upon the output shaft (20), mating toothed gears for the first and second constant gear pairs (K1, K2) are fixedly situated on the countershaft (30), when selecting one of the first gear, the second gear, the third gear, and the reverse gear, drive from the countershaft (30) is transmitted to the output shaft (20) via the first constant gear pair (K1) and, when shifting from the third gear to the fourth gear, the third synchronizing clutch (SK1/K2) engages the idler toothed gear (K2-1) of the second constant gear pair with the output shaft (20) and disengages the idler toothed gear (K1-1) of the first constant gear pair (K1) from the output shaft (20), and a sixth synchronizing clutch (S2/3) engages the idler toothed gear (2-1) of the second gear with the drive shaft (10), when engaging the fifth gear, the sixth synchronizing clutch (S2/3) engages the idler toothed gear (3-1) of the third gear with the drive shaft (10), and when engaging the sixth gear, the second synchronizing clutch (S3/K2) engages the idler toothed gear (K2-1) of the second constant gear pair (K2) with the drive shaft (10) so that drive is transmitted directly to the output shaft (20) via the idler toothed gear (K2-1) of the second constant gear pair (K2).

* * * * *